United States Patent [19]
Keller

[11] Patent Number: 5,552,705
[45] Date of Patent: Sep. 3, 1996

[54] NON-OBTRUSIVE WEAPON DETECTION SYSTEM AND METHOD FOR DISCRIMINATING BETWEEN A CONCEALED WEAPON AND OTHER METAL OBJECTS

[76] Inventor: George V. Keller, 239 S. Dekker Dr., Golden, Colo. 80401

[21] Appl. No.: 457,535

[22] Filed: Jun. 1, 1995

[51] Int. Cl.$^6$ ............ G01N 27/72; G01R 33/12; G08B 13/24
[52] U.S. Cl. ............ 324/239; 324/243; 340/551
[58] Field of Search ............ 324/239, 240, 324/241, 242, 243, 326, 327, 328, 329; 340/552, 551

[56] References Cited

U.S. PATENT DOCUMENTS 3,707,672  12/1972  Miller et al. .................. 324/239
4,894,619   1/1990  Leinonen et al. .............. 324/329

*Primary Examiner*—Walter E. Snow
*Attorney, Agent, or Firm*—Edwin H. Crabtree; Ramon L. Pizarro; Donald W. Margolis

[57] ABSTRACT

A non-obtrusive, non-threatening weapon detection system for discriminating between a concealed weapon and other metal objects. The system is designed for a high probability of detection with a low false alarm rate. When the subject system is in use, a person under surveillance need not be aware that he or she is being monitored nor is the person's privacy invaded. The system includes the use of a magnetic field generator for transmitting low intensity electromagnetic step pulses causing eddy currents to flow in any metal object carried by the person. The eddy currents scatter a signal that is detected by one or more fast response magnetic field sensors. The eddy currents excited in the metal body, which may be called a target, by the leading edges of the transmitted step pulses take the form of an exponentially decaying transient immediately following the step pulses abrupt initial rise. This "decay curve" provides a basic observable, namely, a time constant of the current decay. The decay curve is analyzed by an appropriate means such as a preprogrammed computer, to determine accurately the time constant of the decay curve. The processed information can then be compared with similar values of the time constant contained in a stored data base to predict the nature of the target. The analyzed information allows an observer to identify the target as being threatening or non-threatening.

21 Claims, 2 Drawing Sheets

NON-OBTRUSIVE WEAPON DETECTION SYSTEM AND METHOD FOR DISCRIMINATING BETWEEN A CONCEALED WEAPON AND OTHER METAL OBJECTS

BACKGROUND OF THE INVENTION (a) Field of the Invention

This invention relates to a system for detecting different types of metal objects and more particularly, but not by way of limitation, to a non-obtrusive weapon detection system which allows an observer to discriminate between a handgun and other metal objects carried on a person.

(b) Discussion of Prior Art

Heretofore there have been a variety of patents describing the use of electromagnetic detection systems in underground mining applications and exploration. For example, U. S. Pat. Nos. 5,185,578, 5,066,917, 4,994,747 and 5,260,660 all to Stolarczykz, describe methods and apparatus for detecting underground electrically conductive objects, ore zones, etc. using transmitted electromagnetic energy. Both downhole receivers and downhole transmitters are used in these detection systems.

In U.S. Pat. No. 4,978,920 to Mansfield el al., a magnetic field screen is described. The screen is developed by a coil surrounded by a set of electrical conductors in a specific region in space. U.S. Pat. No. 4,959,559 to Ziolkowski discloses the use of wave propagation equations for producing localized pulses of wave energy. U.S. Pat. Nos. 4,821, 023 and 4,866,424 to Parks describe state-of-the-art walk-through metal detectors using electromagnetic waves for detecting weapons.

None of the above mentioned patents describe the use of a non-obtrusive weapon detection system incorporating the recognition of specific metal objects through the determination of a characteristic time constant and comparison of this value with a data base containing corresponding values for a wide variety of metal objects. The pulses cause an eddy current to flow in a metal object on a person with a resultant scattered signal which allows an observer to identify objects that are threatening or non-threatening.

SUMMARY OF THE INVENTION

In view of the foregoing, it is a primary object of the present invention to provide an innovative and non-obtrusive weapon detection system which can discriminate between different types of weapons and other objects carried on a person, carried in briefcases and luggage, in packaging, storage containers and any other transportation means where handguns and weapons may be smuggled or hidden.

Another object of the system is a person under surveillance need not be aware that he or she is being monitored. The system provides for detection without invading a person's privacy.

Still another object of the subject weapon detection system is unlike today's obtrusive metal detectors, a person is not required to turn over other metal objects carried on the person or to walk through a portal in order to determine the presence of a potentially dangerous metal object.

Yet another object of the invention is the system is designed for a high probability of weapon detection with a low false alarm rate. The weapon detection system is capable of discriminating a concealed weapon from other metal objects such as key rings, coins, jewelry, belt buckles, etc.

Another object of the invention is it's use in a variety of applications such as in the prevention of armed robbery in high-risk business establishments such as convenience stores, restaurants, gas stations, taxi cabs and buses, law enforcement, security systems for large and small gathering places as in banks, airports, schools, public building and courthouses, prisons, crowd control areas, military uses, particularly in peacekeeping operations, and other requirements where a non-obtrusive weapon detection system is required.

The subject weapon detection system includes a magnetic field generator for transmitting low intensity electromagnetic step pulses, similar to a series of step functions, and causing eddy currents to flow in a metal object carried by the person. The eddy currents create a scattered signal that is detected by one or more fast response magnetic field sensors. The eddy currents take the form of an exponentially decaying transient magnetic field with a duration of a few tens of microseconds. This "decay curve" provides a basic observable, namely, the time constant of the current decay. A computer is used to process the information of the time constant of the decay curve. The analyzed information allows an observer to identify objects that are threatening or non-threatening.

These and other objects of the present invention will become apparent to those familiar with weapon detection systems and the use of low intensity electromagnetic pulses created as a series of step functions and showing novel construction, combination, and elements as described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
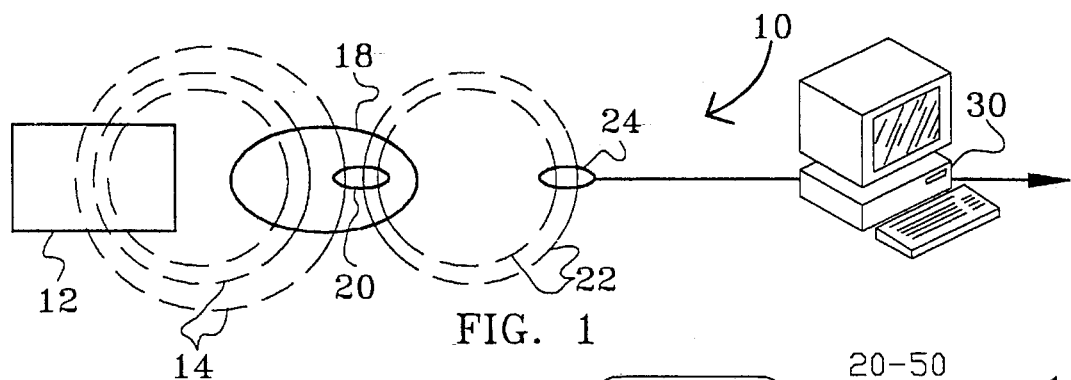
FIG. 1 is a schematic of the electromagnetic weapon detection system.

Basic Theory for Electromagnetic Weapons Detection & Identification

The detection and identification of concealed weapons as described herein uses low frequency electromagnetic fields and is based on an appropriate solution of Maxwell's equations. The problem is that of computing the magnetic field scattered from a small conductive mass when it is energized with a low frequency electromagnetic field. The subject has been analyzed in detail by Kaufman and Keller as published in reference Kaufman, A. A., and Keller, G. V., 1985, Inductive Mining Prospecting, Part I: Theory: Elsevier, Amsterdam 620 pp. Rather than repeat the details of the developments described in this publication, selected results pertinent to the problem at hand as to the identification of concealed weapons are described herein.

Starting with a rough approximation to the problem, it is assumed that a weapon has the form of a sphere with radius "" and a conductivity "$\sigma$". The weapon is illuminated with an electromagnetic wave in the form of step pulses. When the weapon is illuminated, an instantaneous step change occurs in the amplitude of the magnetic field vector. The electromagnetic field is considered essentially planar in the vicinity of the weapon. The strength of a primary field in the vicinity of the weapon (that is, the magnetic field if no weapon were present) is defined as "$H_0$".

Using a quasi-static solution of Maxwell's equations, we find that the primary magnetic field around the sphere is increased by an amount due to currents induced to flow within the sphere given by the following three equations (Kaufman and Keller, 1985, eq. 3.90 and 3.91, p. 166):

$$E_\phi^a = \frac{3K B_0 a^3 \sin\theta}{R^2} \sum_{s=1}^{\infty} \frac{q_s e^{-q_s t}}{[k_s^2 a^2 + (K-1)(K-2)]}$$

$$B_R^a = \frac{6K B_0 a^3 \cos\theta}{R^3} \sum_{s=1}^{\infty} \frac{e^{-q_s t}}{[k_s^2 a^2 + (K-1)(K-2)]}$$

$$B_\theta^a = \frac{3K B_0 a^3 \sin\theta}{R^3} \sum_{s=1}^{\infty} \frac{e^{-q_s t}}{[k_s^2 a^2 + (K-1)(K-2)]}$$

where "$E_\rho^a$", "$B_R^a$" and "$B_\theta^a$" are the only components of the anomalous fields caused by currents induced in the sphere. These components are expressed in a spherical coordinate system centered on the sphere, with "R" being in the direction of the incident field. Other quantities in the equations are defined as:

$K=\mu/\mu_o$ (the relative magnetic permeability of the weapon).

$q_s = k_s^2/\sigma\mu$ $k_s = \pi s/\alpha$ (s=1, 2, 3, . . . , $\infty$)

and "t" is time (following the initiation of the current step).

The form of each electromagnetic field component is that of a sum of exponentially decaying transients. The asymptotic behavior of these transients is now examined. During the early part of the transient response of the electromagnetic field (t→0), Kaufman and Keller (1985, eq. 3.100, p. 169) derive expressions for the anomalous magnetic field components.

$$B_R^a = B_0 \left(\frac{a}{R}\right)^3 \cos\theta \left[1 - \frac{6}{\sqrt{\pi}} (\alpha t)^{1/2}\right]$$

$$B_\theta^a = B_0 \frac{1}{2} \left(\frac{a}{R}\right)^3 \sin\theta \left[1 - \frac{6}{\sqrt{\pi}} (\alpha t)^{1/2}\right]$$

where $\alpha + 1/\sigma\mu a^2$. These expressions remain valid only for times that meet the condition at $\alpha t \ll 1$. Computations show that with $\alpha t = 0.03$, the error in approximation is only 10%.

During the late part of the transient decay, the field is almost entirely determined by the first exponential terms:

$$B_R^a = \frac{6B_0}{\pi^2} \left(\frac{a}{R}\right)^3 \cos\theta e^{-t/\tau_0}$$

$$B_\theta^a = \frac{3B_0}{\pi^2} \left(\frac{a}{R}\right)^3 \sin\theta e^{-t/\tau_0}$$

$$E_\phi^a = \frac{3B_0 a}{\tau_0 \pi^2} \left(\frac{a}{R}\right)^2 \sin\theta e^{-t/\tau_0}$$

where $\tau_0 = \sigma\mu a^2/\pi^2$ a is a time constant.

These results have a remarkable simplicity which is the basis for the design of a highly effective weapons detection system. Each of the three expressions for field components is of the form of a product of two terms, the first term of which involves only the geometry and magnitude of the primary field in the vicinity of the weapon, and a second term involving a time constant, but independent of the geometry and strength of the field incident on the weapon. Measurement of the time constant provides a means for weapon detection which is free of false alarms due to variations in primary field strength.

The time constant can be determined from a plot of the transient magnetic field on semi-log graph paper (the slope of the curve is the time constant). The time constant can also be determined from the expressions:

$$\tau_0 = -\frac{B_R^a}{\partial B_R^a/\partial t} = -\frac{B_\theta^a}{\partial B_\theta^a/\partial t}$$

The time constant is a function only of the conductivity-permeability product of a sphere and its cross sectional area. The time constant becomes larger with an increase in either parameter. The time constant can be regarded as a direct measure of the "electromagnetic scattering cross section" of the sphere.

Weapons have a complex geometry. Therefore a question arises as to whether or not this simplicity extends to more complicated shapes of weapons. Kaufman and Keller (1985) extended the analysis to axial symmetry and arrive at an expression for the scattering time constant as follows (eq. 3,220, p. 223):

$$\tau_0 = \sigma\mu a^2/q_1$$

where "$q_1$" depends on the shape of the conductive body

The significance of the time constant in identifying a specific weapon of an even more complicated shape is obvious. All weapons of the same size, shape and metallic composition will be characterized by a scattered electromagnetic field from an incident current step will be the same, no matter what the strength of the incident field or the distance of the weapon from the transmitter or the receiver array. Thus, weapons can be differentiated at least within the precision with which the time constant of the decaying magnetic field can be determined.

Time constant for a typical weapon

The appropriate way to determine the time constant for a real weapon is by illuminating that weapon with an electromagnetic field using step pulses and measuring the time constant from the decaying field. However, a preliminary estimate can be made by substituting numbers in the expression for the time constant. For example, assume that the conductivity-permeability product of the steel in a weapon is of the order of 1 siemens×henries/square meter, the radius of the sphere enclosing a weapon is 0.1 meter, the form factor "q" is 10 (the more convoluted the shape of the metallic body, the greater will be the form factor). Substituting these numbers, we have an order of magnitude estimate for the time constant of the hypothetical weapon as 1 millisecond.

The weapon will usually be carried on the body of a person. Human flesh and bone is conductive, therefore, the time constant for the field scattered from the person is compared with the time constant of the weapon. The conductivity-permeability product for a human body is probably of the order of magnitude of 10 siemens×henries/square meter. The corresponding order of magnitude time constant for a human body is 0.1 microsecond.

These are rough estimates, and can be refined by direct measurement. But, the two time constants are so different that there is no likelihood that one will obscure the other.

Figure 2:
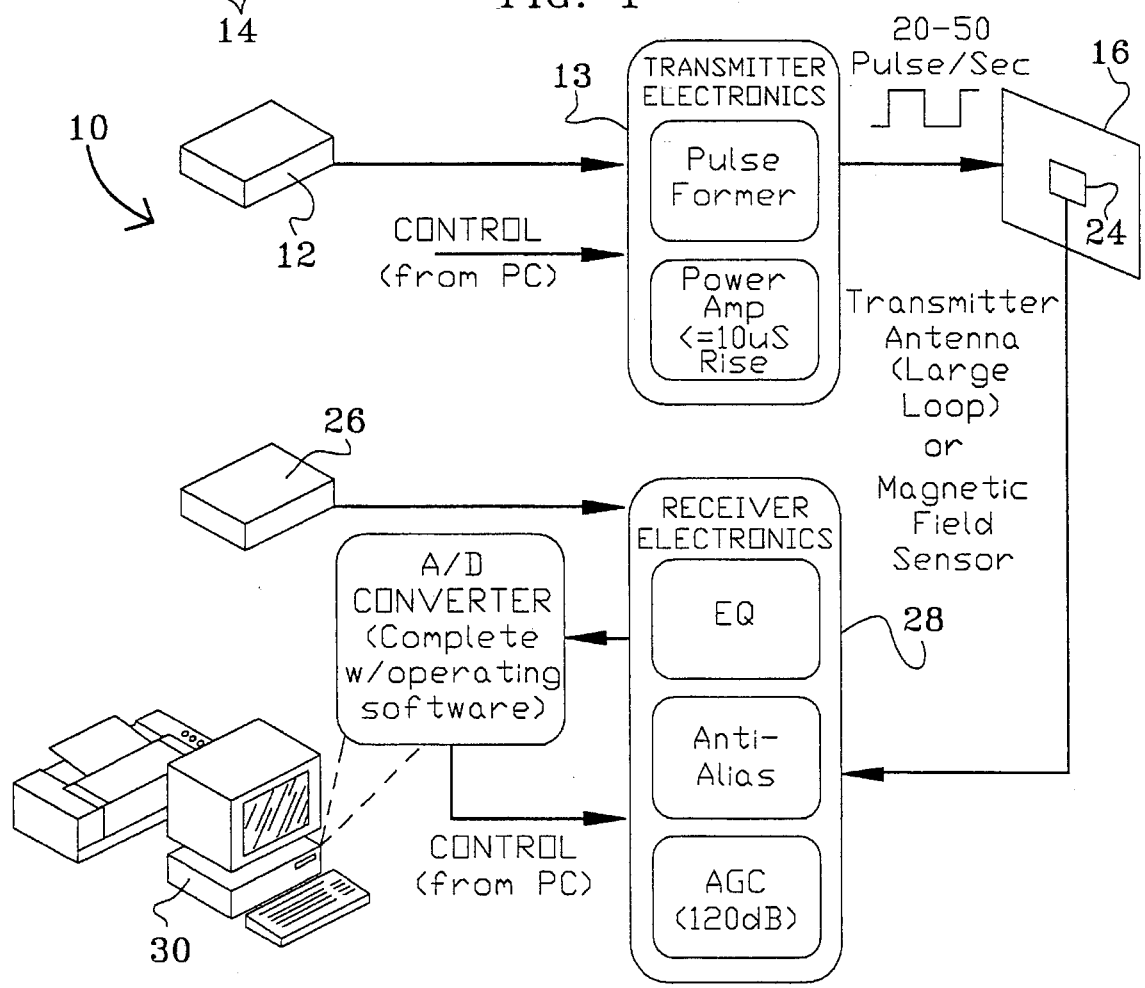
FIG. 2 is a more detailed schematic of the detection system including the transmitter and receiver electronics and transmitter and receiver antennas.

Referring to both FIGS. 1 and 2, schematics of the electromagnetic weapon detection system are shown having a general reference numeral 10. The system 10 includes a transmitter 12 for illuminating an electromagnetic signal in the form of a pulse step. The transmitter 12 includes solid state electronics 13 with a switch with a 10 usec risetime, a pulse former with 20 to 50 pulses per second and rated for 20 to 60 ampere.

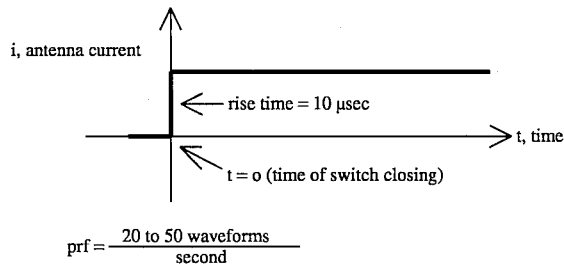

The 20 to 50 pulses per second of electromagnetic signals are shown as dashed rings 14 emanating from the transmitter 12 toward a large loop transmitter antenna 16 shown in FIG. 2. A solid ring 18 indicates an interrogated volume. For example, the interrogated volume 18 might be an entrance area into a store or bank, a walkway between buildings, a departure area at an airport, the boarding area of a bus, etc.

A temporal change in the electromagnetic wave field causes current to flow in a metal object 20. The metal object 20 is also refered to as a target. Scattered electromagnetic signals are shown as dashed rings 22 emanating from the metal object 20. The scattered electromagnetic signals 22 have the form of branches of an exponential curve, with a time constant that is a function of the size, shape and material composition of the metal object 20 under observation. The scattered electromagnetic signals 22 are detected by a loop receiver antenna 24 or other fast response magnetic field sensors acting as a magnetometer or by an array of magnetometers. From the antenna 24, a signal processing unit 26 with receiver electronics 28 conditions the scattered signals 22 in preparation for digital processing of the information. This information is processed using a computer 30 with A/D converter or equivalent dedicated digital circuitry and wherein the time constant of the metal object 20's decay curve is analyzed using a software code capable of determining time constants and the various scattering cross-sections of the objects under observation.

The signal processing system using the computer 30 must accomplish three thing: 1) accurate determination of the scattered signal 22; 2) computation of the time constant embedded in the signal 22; and 3) determination of the nature of metal object 20 scattering the signal 22 with that particular time constant.

1) Accurate determination of the signal 22 can best be accomplished through synchronous detection (averaging) of several signals caused by repeated application of the excitation field, along with application of appropriate linear and non-linear digital filtering schemes for which the design may be specific to the site where the system is installed. Rapid determination of the meaning of a signal is of the essence in an effective security system, with a need to acquire and process data in a very short time being an essential part of the design of the system. Ideally, data acquisition and processing of the signals should be accomplished in a time not exceeding one second, though in some applications, times as long as several seconds may be appropriate. For a system operating at a basic frequency of 50 Hertz, 20 step excitations can be achieved in one-tenth of a second. It is expected that synchronous addition and linear filtering will be accomplished with an embedded analog-to-digital (A/D) converter linked directly to a preprogrammed central processing unit (CPU) to yield a signal curve like those shown in FIG. 3 within at most a few microseconds following completion of the excitation cycle of the system, a time which will range from as little as 0.1 second to as great as several seconds.

2) Accurate determination of a time constant will be accomplished by post-processing after a cycle of excitation has been completed and an averaged signal resides within digital memory of the digital system. One approach to determining the time constant is shown by data in FIG. 4. Here, synchronously stacked signals from a metal target have been replotted (algebraically transformed) by using the logarithm of the signal strength, rather than the signal strength itself. With this transformation, an exponential decay curve now appears as a straight line, with the slope of that line being the time,constant. One easy approach to determining time constant is by fitting the transformed data, that is, a signal in which the signal amplitude is converted to its logarithm, with a best-fit one-parameter linear correlation function. The one parameter in the fit is the slope, which is the parameter to be used in identifying the nature of the scatterer. It is anticipated that this analysis will require less than 0.1 second.

There are many standard programs for determining such one-parameter correlation functions; the approach just described is illustrative of any of these, and should be considered only as an example of how this step in signal analysis can be accomplished.

3) With the numerical value for the time constant associated with a detected target, it is next necessary to determine the likely nature of that target, again in a timely manner. One approach is to compile a catalog of time constants for various weapons and of other metal objects which can be carried on the person, in a storage unit, etc. This catalog being referred to herein as a "data base". In this data base, messages would be stored describing the potential threat corresponding to a given time constant. The "address" of each cell in the data base would be a number which is the integer equivalent of the time constant which has been determined in step 2 above. In this approach, searching even as extremely large data base will require only tens of milliseconds.

There are many standard programs for searching a one-parameter data base. The approach just described is illustrative of any of the these and should be considered only as an example of how the nature of the threat represented by a given time constant can be determined in a timely manner.

Figure 3:
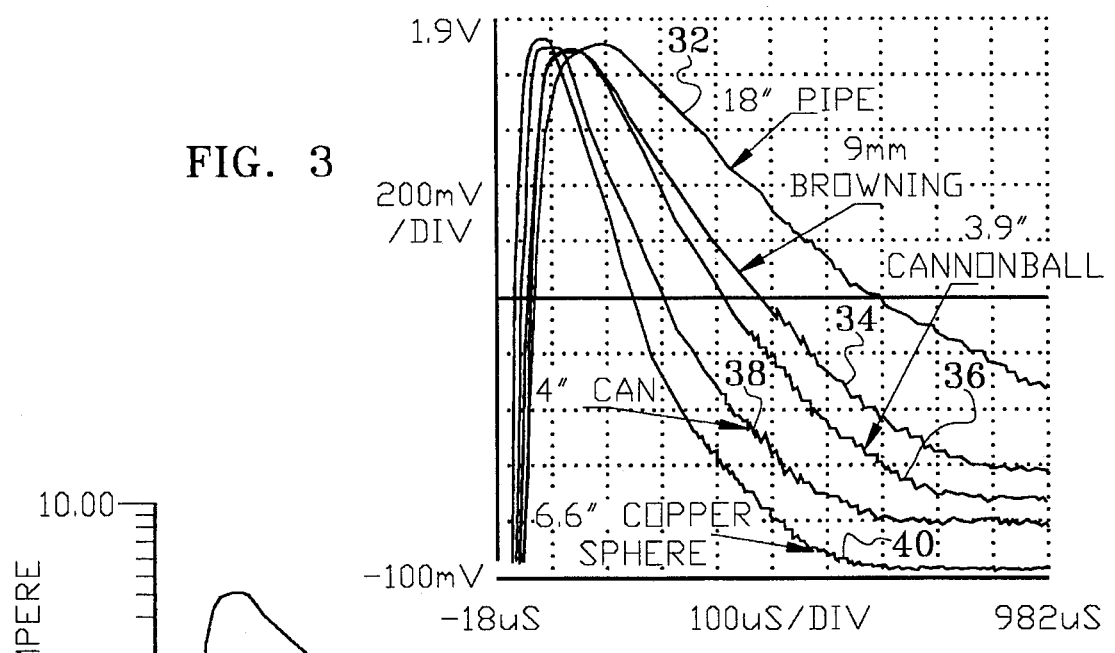
FIG. 3 illustrates a plurality of time-decay curves of five metal objects which have been illuminated and are under observation.

In FIG. 3, an example of the scattering properties observed for a variety of five different metal objects using step pulses, such as a Heaviside pulse, are illustrated. Note the peak amplitude of the curves of the five different metal objects are similar and in this example slightly less than 1.9 volts. As the decay of each curve takes place, each object under observation takes on it's own recognizable curve characteristics. Curve 32 for an 18 inch pipe for example has a flatter curve than curve 34 for a Browning 9 mm pistol and curve 36 for a 3.9 inch cannonball. Curve 38 for a 4 inch can and curve 40 for a 6.6 inch copper sphere illustrate the shapes of decay curves under observation. This figure shows how the different metal objects have distinct decay transients that are measurable and wherein the time constant of each object is a direct measure of the electromagnetic scattering cross section of object's profile.

Figure 4:
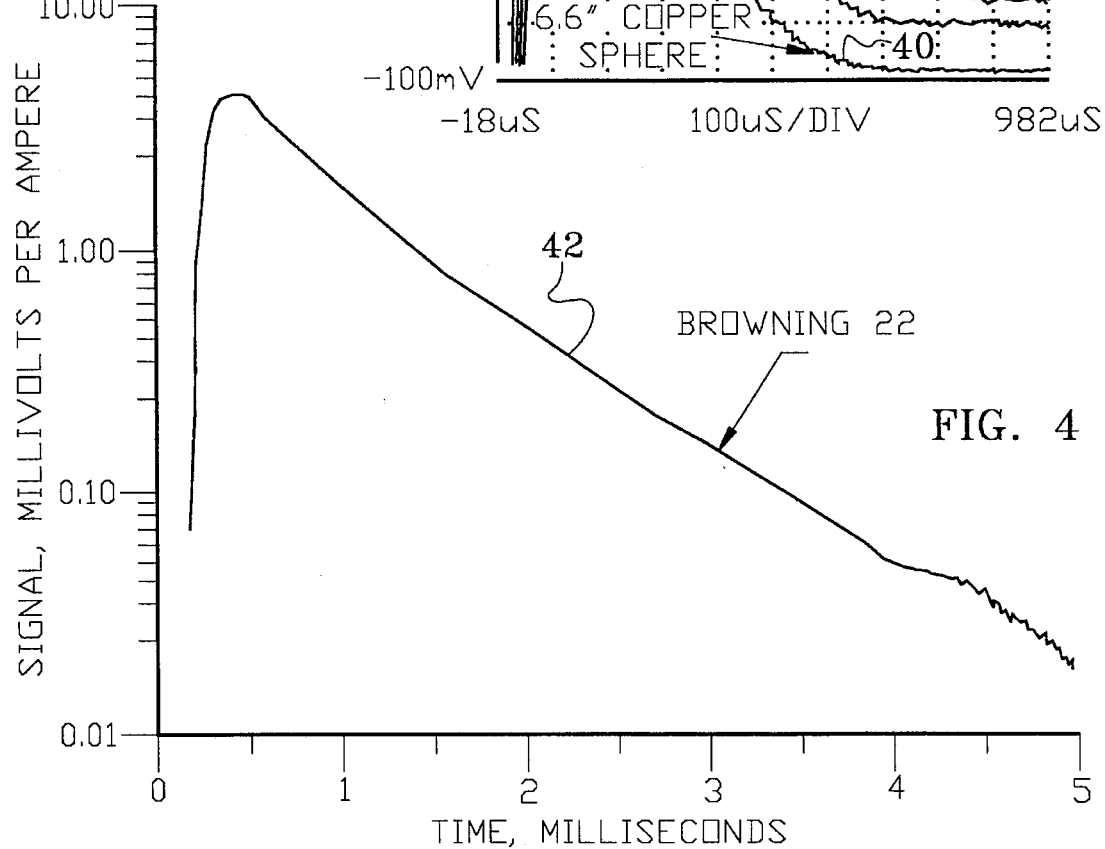
FIG. 4 illustrates an example of a signal scattered from a 22 caliber handgun. The voltage amplitude of the signal has been transformed to a logarithm of the voltage amplitude.

In FIG. 4, an example of a signal 42 scattered from a 22 caliber handgun is illustrated with the voltage amplitude of the signal 42 having been tranformed to a logarithm of the voltage amplitude. This transformation has changed the form of the transient decay curve as illustrated in FIG. 3 to that of an approximate straight line with a slope equal to the time constant of the decay of the signal 42. Note that this behavior is distorted at times before a few tens of microseconds by the limited rate of response of the magnetic field sensor used in this particular experiment. Also, the decay curve, when at times longer 3.5 milliseconds (3500 microseconds), becomes distorted as the signal strength drops to a point where extraneous noise is significant. The essence of practical design of equipment is to obtain accurate information about the strength of the scattered signal over the time range from a few tens of microseconds to a few milliseconds.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A non-obtrusive weapon detection system for detection of and discrimination between a concealed weapon and other metal objects, the system comprising:

a transmitter for transmitting low intensity electromagnetic step pulses and causing eddy currents to flow in a metal object under observation, the eddy currents creating a plurality of scattered signals sufficient to accurately plot a "decay curve" due to the relaxation of the eddy currents;

a receiver for detecting the scattered signals from the eddy currents; and data processing and computing equipment means connected to said receiver, said data processing and computing equipment means digitally processing the scattered signals for defining a time constant of the decay curve, the processed information of the time constant of the decay curve providing an accurate determination of a relationship to the conductive properties of the object under surveillance and the size and shape of the object using appropriate mathematical equations, the processed information allowing an observer to identify objects that are threatening or non-threatening.

2. The weapon detection system as described in claim 1 wherein said transmitter transmits repeated step pulses causing eddy currents to flow in the metal object under observation and creating additional scattered signals which are digitally processed and synchronously averaged with the scatter signals for defining the time constant of the decay curve and providing increased accuracy in the determination of the object under observation.

3. The weapon detection system as described in claim 2 wherein the scattered signals are synchronously stacked and replotted, ie. algebraically transformed, by using a logarithm of the scattered signals strength and creating an exponential decay curve as a straight line, with the slope of the straight line being the time constant.

4. The weapon detection system as described in claim 1 wherein said data processing and computing equipment includes an embedded analog-to-digital (A/D) converter linked directly to a preprogrammed central processing unit (CPU) for synchronous averaging and linear filtering to yield the decay curve in a range of 1 to 10 microseconds following completion of the transmission of the step pulses, the time of transmission of the step pulses in a range of 0.1 to 2 seconds.

5. The weapon detection system as described in claim 1 wherein said data processing and computing equipment means is used for comparing the time constant of the decay curve of the metal object under observation with similar values of time constants of other metal objects contained in a data base of said data processing and computing equipment means to predict the nature of the metal object under observation and allow an observer to identify the metal object as being threatening or non-threatening.

6. The weapon detection system as described in claim 1 wherein said transmitter transmits step pulses causing eddy currents to flow in more than one metal object under observation and at the same time, said data processing and computing equipment means digitally processing scattered signals for defining time constants of decay curves of the metal objects thereby providing an accurate determination of a relationship to the conductive properties of the metal objects under surveillance and the sizes and shapes of each metal object.

7. The weapon detection system as described in claim 1 wherein said receiver is a fast response magnetic field sensor.

8. The weapon detection system as described in claim 1 wherein said receiver is a plurality of fast response magnetic field sensors.

9. The weapon detection system as described in claim 1 wherein said transmitter is a magnetic field generator.

10. A non-obtrusive weapon detection system for detection of and discrimination between a concealed weapon and other metal objects, the system comprising:

a transmitter for transmitting low intensity electromagnetic step pulses and causing eddy currents to flow in a metal object under observation, the eddy currents excited by a transient associated with a rise-time of the step pulses and with the eddy currents relaxing as soon as excitation is over and creating scattered signals to plot accurately a "decay curve" of eddy current relaxation;

a receiver for receiving the scattered signal from the eddy currents; and a computer connected to said receiver and used to digitally process scattered signals, the scattered signals synchronously stacked and replotted, ie. algebraically transformed, by using a logarithm of the scattered strength and creating an exponential decay curve as a line, with the Slope of the straight line being the time constant, the processed information of the time constant of the decay curve providing an accurate determination of a relationship to the conductive properties of the object under surveillance and the size and shape of the object using appropriate mathematical equations, the processed information allowing an observer to identify objects that are threatening or non-threatening.

11. The weapon detection system as described in claim 10 wherein said computer includes an embedded analog-to-digital (A/D) converter linked directly to a preprogrammed central processing unit (CPU) for synchronous averaging and linear filtering to yield the decay curve in a range of 1 to 10 microseconds following completion of the transmission of the step pulses, the time of transmission of the step pulses in a range of 0.1 second to 2 seconds.

12. The weapon detection system as described in claim 10 wherein said computer is used for comparing the time constant of the decay curve of the metal object under observation with similar values of time constants of other metal objects contained in a data base of said computer to predict the nature of the metal object under observation and allow an observer to identify the metal object as being threatening or non-threatening.

13. The weapon system as described in claim 10 wherein said transmitter transmits step pulses causing eddy currents to flow in more than one metal object under observation at the same time and said computer digitally processing scattered signals for defining time constants of decay curves of the metal objects thereby providing an accurate determination of a relationship to the conductive properties of the metal objects under surveillance and the sizes and shapes of each metal object.

14. The weapon system as described in claim 10 wherein said transmitter sends large amplitude, long period, square waves of switched dc current, the switching of the current inducing eddy currents to flow in a metal object carried by a person or stored in a storage container, luggage and the like.

15. The weapon system as described in claim 10 wherein the electromagnetic step pulses are transmitted using a large loop antenna.

16. The weapon system as described in claim 10 wherein the receiver is a single-axis coil magnetometer.

17. A method for observing and discriminating between a concealed weapon and other metal objects carried by a person or storied in various carriers such as luggage, boxes, and the like, the steps comprising:

transmitting low intensity electromagnetic step pulses outwardly from a magnetic field generator and causing eddy currents to flow in the metal object creating a plurality of scattered signals;

detecting the scattered signals from the eddy currents using a receiver, the leading edges of the transmitted step pulses taking the form of an exponentially decay curve with time constant which can be accurately plotted; and digitally processing with a preprogrammed computer the information of the time constant of the decay curve, the processed information providing an accurate relationship of the conductive properties of the object under surveillance and the size and shape of the object using appropriate mathematical equations, the analyzed information allows an observer to identify objects that are threatening or non-threatening.

18. The method as described in claim 17 further including the step of using the preprogrammed computer and comparing the time constant of the decay curve with similar values of time constants contained in a stored data base of the computer to predict the nature of the metal object and allowing an observer to identify the metal object as being threatening or non-threatening.

19. The method as described in claim 17 wherein the transmitter is a magnetic field generator used for transmitting low intensity electromagnetic step pulses in a range of 20 to 50 pulses per second.

20. The method as described in claim 17 wherein the receiver is a fast response magnetic field sensor.

21. The method as described in claim 17 wherein the receiver is a plurality of fast response magnetic field sensors.

\* \* \* \* \*